United States Patent
Xiao et al.

(10) Patent No.: US 6,885,947 B2
(45) Date of Patent: Apr. 26, 2005

(54) METHOD FOR JOINT INTERPRETATION OF MULTI-ARRAY INDUCTION AND MULTI-COMPONENT INDUCTION MEASUREMENTS WITH JOINT DIP ANGLE ESTIMATION

(75) Inventors: Jiaqi Xiao, Houston, TX (US); Berthold Kriegshauser, Houston, TX (US); Otto Fanini, Houston, TX (US); Liming Yu, Stafford, TX (US); Gulamabbas A. Merchant, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 265 days.

(21) Appl. No.: 10/186,927

(22) Filed: Jul. 1, 2002

(65) Prior Publication Data

US 2003/0028324 A1 Feb. 6, 2003

Related U.S. Application Data

(63) Continuation-in-part of application No. 10/091,310, filed on Mar. 5, 2002, now Pat. No. 6,643,589.
(60) Provisional application No. 60/274,293, filed on Mar. 8, 2001.

(51) Int. Cl.$^7$ ............................................... G01V 1/28
(52) U.S. Cl. ................... 702/17; 702/6; 702/7
(58) Field of Search ................... 702/17, 7, 6

(56) References Cited

U.S. PATENT DOCUMENTS

| | | | |
|---|---|---|---|
| 4,837,517 A | 6/1989 | Barber | 324/339 |
| 5,157,605 A | 10/1992 | Chandler et al. | 364/422 |
| 5,184,079 A * | 2/1993 | Barber | 324/339 |
| 5,428,293 A | 6/1995 | Sinclair et al. | 324/339 |
| 5,446,654 A | 8/1995 | Chemali et al. | 364/422 |
| 5,452,761 A | 9/1995 | Beard et al. | 166/250 |
| 5,774,360 A | 6/1998 | Xiao et al. | 702/6 |
| 5,867,806 A | 2/1999 | Strickland et al. | 702/7 |
| 5,999,883 A | 12/1999 | Gupta et al. | 702/7 |
| 6,047,240 A * | 4/2000 | Barber et al. | 702/10 |
| 6,049,209 A | 4/2000 | Xiao et al. | 324/339 |
| 6,147,496 A | 11/2000 | Strack et al. | 324/343 |
| 6,442,488 B2 | 8/2002 | Xiao et al. | 702/9 |
| 6,502,036 B2 * | 12/2002 | Zhang et al. | 702/7 |
| 6,556,016 B2 | 4/2003 | Gao et al. | 324/343 |
| 6,606,565 B1 | 8/2003 | Strickland et al. | 702/7 |
| 2003/0146752 A1 | 8/2003 | Gianzero et al. | 324/343 |

FOREIGN PATENT DOCUMENTS

| | | |
|---|---|---|
| EP | 0490716 A2 | 6/1992 |
| EP | 0930519 A2 | 7/1999 |

* cited by examiner

Primary Examiner—Marc S. Hoff
Assistant Examiner—Anthony Gutierrez
(74) Attorney, Agent, or Firm—Madan, Mossman & Sriram, P.C.

(57) ABSTRACT

Data are acquired using multi-array logging tool in a borehole having an angle of inclination to a normal to the bedding plane of earth formations. The multi-array measurements are filtered using angle dependent filters to give a filtered curve corresponding to a target one of the multi-array measurements using angle dependent filters. Correlation coefficients are determined for a set of possible dip angles and a relative dip angle is estimated from the correlation coefficients. This dip angle estimate together with bed boundaries obtained from the multi-array measurements are used for inverting multi-component measurements alone or jointly with multi-array measurements to refine the relative dip angle interpretation and give horizontal and vertical formation resistivity.

24 Claims, 7 Drawing Sheets

METHOD FOR JOINT INTERPRETATION OF MULTI-ARRAY INDUCTION AND MULTI-COMPONENT INDUCTION MEASUREMENTS WITH JOINT DIP ANGLE ESTIMATION

CROSS-REFERENCES TO RELATED APPLICATIONS

This application is a continuation in part of application Ser. No. 10/091,310, now U.S. Pat. No. 6,643,589, filed on Mar. 5, 2002, entitled "Simultaneous Determination of Formation Angles and Anisotropic Resistivity Using Multi-Component Induction Logging Data," of Zhang et al. and having the same assignee as the present application and which claims pliority from U.S. Provisional Patent Application Ser. No. 60/274,293 filed on March 8, 2001.

BACKGROUND OF THE INVENTION

1. Field of the Invention

The invention is related generally to the field of electrical resistivity well logging methods. More specifically, the invention is related to methods for automatically estimating dip angle through joint interpretation of multi-array induction and multi-component induction measurements.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

The physical principles of electromagnetic induction resistivity well logging are described, for example, in H. G. Doll, *Introduction to Induction Logging and Application to Logging of Wells Drilled with Oil-Based Mud*, Journal of Petroleum Technology, vol. 1, p.148, Society of Petroleum Engineers, Richardson, Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al.; and U.S. Pat. No. 5,452,761 issued to Beard et al.

A typical electrical resistivity-measuring instrument is an electromagnetic induction well logging instrument such as described in U.S. Pat. No. 5,452,761 issued to Beard et al. The induction logging instrument described in the Beard '761 patent includes a number of receiver coils spaced at various axial distances from a transmitter coil. Alternating current is passed through the transmitter coil, which induces alternating electromagnetic fields in the earth formations. Voltages, or measurements, are induced in the receiver coils as a result of electromagnetic induction phenomena related to the alternating electromagnetic fields. A continuous record of the voltages form curves, which are also referred to as induction logs. The induction instruments that are composed of multiple sets of receiver coils are referred to as multi-array induction instruments. Every set of receiver coils together with the transmitter is named as a subarray. Hence, a multi-array induction consists of numerous subarrays and acquires measurements with all the subarrays.

Voltages induced in the axially more distal receiver coils are the result of electromagnetic induction phenomena occurring in a larger volume surrounding the instrument, and the voltages induced in the axially proximal receiver coils are the result of induction phenomena occurring more proximal to the instrument. Therefore, different receiver coils see a formation layer boundary with different shoulder-bed contributions, or shoulder-bed effects. The longer-spaced receiver coils see the formation layer boundary at further distance from the boundary than the shorter-spaced receiver coils do. As a result, the logs of longer-spaced receiver coils have longer shoulder-bed effects than the logs of shorter-spaced receiver coils. The logs of all the receiver coils form a certain pattern.

If the layers are not perpendicular to the axis of the instrument, the conductivity of the media surrounding the instrument can vary azimuthally, causing the inferences about the conductivity from the measurements of the induction voltage to be in error. A method for correcting the error is described in U.S. Pat. No. 5,774,360 issued to Xiao and Zhou. The method requires the relative dip angle as a priori information. The relative dip angle is the angle between the borehole axis and the normal of the bedding plane. Because the formation layers can also be inclined, the relative dip angle is normally unknown even though the wellbore deviation is known. U.S. Pat. No. 6,049,209 issued to Xiao and Geldmacher teaches another method has also been developed to interpret induction logs in the environments of relative inclination and anisotropy. The method requires the relative dip angle and the anisotropy coefficient as a priori information. The anisotropy coefficient can be defined as the ratio between the resistivity perpendicular to bedding and the resistivity parallel to bedding.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art. These eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 5,999,883 issued to Gupta et al., (the "Gupta patent"), the contents of which are fully incorporated here by reference, discloses a method for determining the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to the direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

Shoulder bed corrections related to the effect of formations above and below the depth being evaluated also have to be applied to the data. Methods for making these corrections to data acquired with conventional logging tools are well known in the art.

For example, U.S. Pat. No. 5,446,654 to Chemali teaches the conversion of a resistivity log as a function of well depth into a rectangularized curve so that the interfaces of the adjacent strata are located, and a suitable number of iterations, a correction factor is applied. The corrected rectangular log is obtained with a correction coefficient computed at each depth. For each computation, the impact of all the strata within a specified depth window is considered, while strata beyond that window are simplified by representing the strata beyond the window with single equivalent bed values to reduce the number of computations required. This then provides a resistivity log which is substantially free of shoulder bed effect.

The method of U.S. Pat. No. 5,867,806 to Strickland et al. corrects for shoulder bed effect in LWD resistivity logs through inversion. The method selects one or more control depths at one or more locations of each of a plurality of detected beds in the formation. The method then estimates the resistivity of each bed only at the selected control depths to produce an estimated resistivity of the beds. The method then computes a simulated log value at each control depth using a current estimate of the resistivity of the beds. The computer-simulated log is then computed to the actual log data at each control depth, and the resistivity of each bed is adjusted using the difference between the actual and simulated values at the control depths. The method iteratively repeats a plurality of times until the simulated log substantially matches the actual log at the control depths.

Electrically anisotropic reservoirs are encountered frequently in hydrocarbon exploration. For accurate saturation estimation and optimum hydrocarbon recovery from these reservoirs, it is essential to detect and properly describe their electrical properties. For example, in laminated sand-shale sequences or sands with different grain size distributions, the vertical resistivity (perpendicular to the bedding) is the more indicative of the hydrocarbon content than the horizontal resistivity (parallel to the bedding). However, the response measured by conventional induction tools with their transmitter-receiver coil moments oriented normal to bedding is dominated by the horizontal resistivity. Therefore, a petrophysical evaluation based on these data can either overlook hydrocarbons present in laminated sands or underestimate their productivity.

The relative formation dip angle is vital for proper and accurate interpretation of data acquired by the new multi-component induction instrument. This newly developed induction instrument comprises three mutually orthogonal transmitter-receiver arrays. These configurations allow us to determine both horizontal and vertical resistivities for an anisotropic formation in vertical, deviated, and horizontal boreholes. A description of the tool can be found in U.S. Pat. No. 6,147,496, *Determining Electrical Conductivity of a Laminated Earth Formation Using Induction Logging*, issued to Strack et al. The transmitters induce currents in all three spatial directions and the receivers measure the corresponding magnetic fields ($H_{xx}$, $H_{yy}$, and $H_{zz}$). In this nomenclature of the field responses, the first index indicates the direction of the transmitter, the second index denotes the receiver direction. As an example, $H_{zz}$ is the magnetic field induced by a z-direction transmitter coil and measured by a z-directed receiver. The z-direction is parallel to the borehole. In addition, the instrument measures all other cross-components of the magnetic fields, i.e., $H_{xy}$, $H_{xz}$, $H_{yx}$, $H_{yz}$, $H_{zx}$, and $H_{zy}$.

The signals acquired by the principal receiver coils ($H_{xx}$, $H_{yy}$, and $H_{zz}$) are used to determine both the horizontal and vertical resistivity of the formation. This is done by inverse processing techniques of the data. These inverse processing techniques automatically adjust formation parameters in order to optimize in a least-square sense the data match of the synthetic tool responses with measured data. Required inputs in this process are accurate information of the relative formation dip and relative formation azimuth. This information can be derived using in addition to the main signals ($H_{xx}$, $H_{yy}$, and $H_{zz}$) the data from the cross-components.

Conventional induction tools comprising only coaxial transmitter-receiver coil configurations do not have azimuthal sensitivity. Therefore, in a horizontal wellbore, the data do not contain information about directionality of the formation. It is not possible to distinguish whether a layer is above or below the borehole from these data alone. There is a need to be able to determine directionality of the formation. This knowledge can be obtained using a subset or all of the cross-components of the new multi-component induction tool allows determination of directionality of the formation The application Ser. No. 10/091,310 by Zhang et al., the contents of which are incorporated herein by reference, teaches a method for simultaneous inversion of measurements made by a multi-component logging tool in order to obtain a layered resistivity model and formation inclination angle and azimuth. A model that includes horizontal and vertical resistivities is used to generate a simulated tool response. An iterative solution that gives an improved match between the model output and the field observations is obtained using a global objective function. The global objective function is defined as a sum of a data objective function (difference between the model output and the observed data) and a model objective function that stabilizes the inversion procedure by placing a penalty on large changes in the model at each iteration. The logging tool includes transmitters and/or receivers with coils inclined to the axis of the tool. One drawback of the application of Zhang et al. is that the dip angle is determined in a simultaneous process with other variables, using a search for a global minimum. A good independent estimate of dip angle enables a more efficient search for a global minimum without becoming trapped in local minima. There is a need for a method of producing an estimate of dip angle that is independent of the multi-component measurements. The method of the present invention satisfies this need.

SUMMARY OF THE INVENTION

The present invention is a method of processing of multi-array and multi-component electrical resistivity measurements of an earth formation using an instrument conveyed in a borehole. A plurality of possible dip angles between the borehole and the earth formation are defined. The multi-array induction measurements are processed using a processor having pre-designed, stored filters corresponding to each of said plurality of possible dip angles. The relative dip angle is determined from the filtered data by maximizing a cross-correlation of the filtered data. The determined dip angle is then used in the inversion of the multi-array data to give horizontal and vertical resistivity values.

BRIEF DESCRIPTION OF THE DRAWINGS

The present invention is best understood by reference to the following figures in which like numbers refer to like elements.

FIG. 3b shows a model of the responses of $H_{xx}$ and $H_{zz}$ in both isotropic and anisotropic materials of FIG. 3a.

DESCRIPTION OF PREFERRED EMBODIMENT

Figure 1:
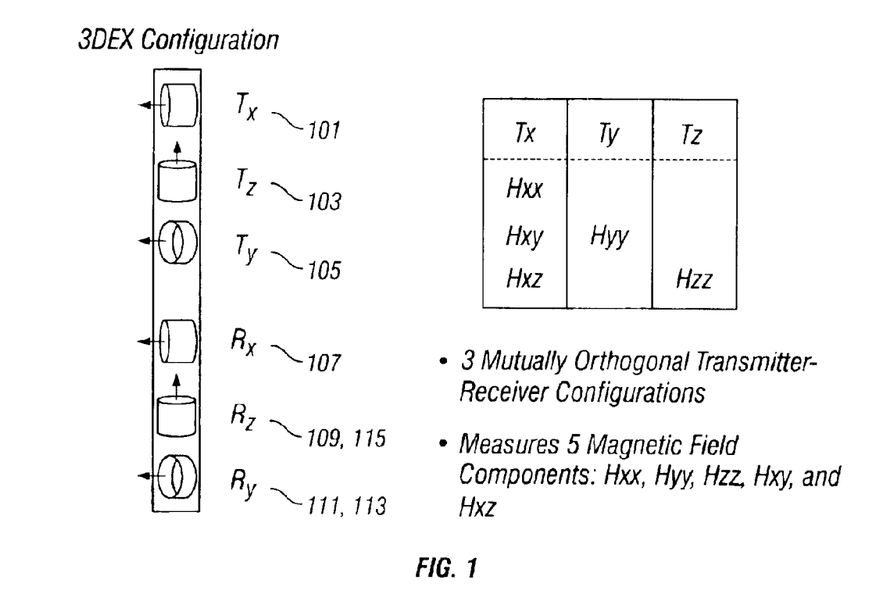
FIG. 1 shows a physical layout of the three transmitter coils and three receiver coils of the logging tool of the invention.

FIG. 1 shows the configuration of transmitter coils and receiver coils in a preferred embodiment of a multi-component measurement device, known as the 3DExplorer™ (3DEX™) induction logging instrument of Baker Hughes. Three orthogonal transmitters 101, 103, and 105 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the normals to the transmitters. The z-axis is chosen to be along the longitudinal axis of the tool, while the x-axis and y-axis are mutually perpendicular directions lying in the plane transverse to the longitudinal axis. Corresponding to each transmitter 101, 103, and 105 are associated receivers 107, 109, and 111, referred to as the $R_x$, $R_z$, and $R_y$ receivers, aligned along the orthogonal system defined by the transmitter normals, placed in the order shown in FIG. 1. $R_x$, $R_z$, and $R_y$ are responsible for measuring the corresponding magnetic fields $H_{xx}$, $H_{zz}$, and $H_{yy}$. In this nominalization of the magnetic fields, the first index indicates the direction of the transmitter and the second index indicates the direction of the receiver. In addition, the receivers $R_y$ and $R_z$, placed in the order shown, correspondingly labeled 113 and 115, measure two cross-components, $H_{xy}$ and $H_{xz}$, of the magnetic field produced by the $T_x$ transmitter (101). It is not necessary for purposes of this invention to use the 3DEX™ as the particular multi-component measurement tool. It is understood that the 3DEX™ is a preferred example of a multi-component measurement tool and reference to the 3DEX™ does not limit the scope of the invention.

This embodiment of the invention is employable at single or multiple frequencies. 3DEX™ cross-component data $H_{xz}$ enables the operator to distinguish between layers above or below the borehole, thus giving directionality to the tool. In a wellbore, 3DEX™ data ($H_{xx}$, $H_{yy}$, and $H_{zz}$) enables decoupling of $R_t$ values into horizontal resistivity $R_h$ and vertical resistivity $R_v$. In a horizontal wellbore, 3DEX™ resolves horizontal and vertical resistivities. Also, it is possible, in a horizontal wellbore, to use horizontal coils to resolve formation resistivities in an anisotropic layer. Further observance of resistivity values and changes of said values enable measurement of proximity and changes in proximity to adjacent layers.

Figure 2:
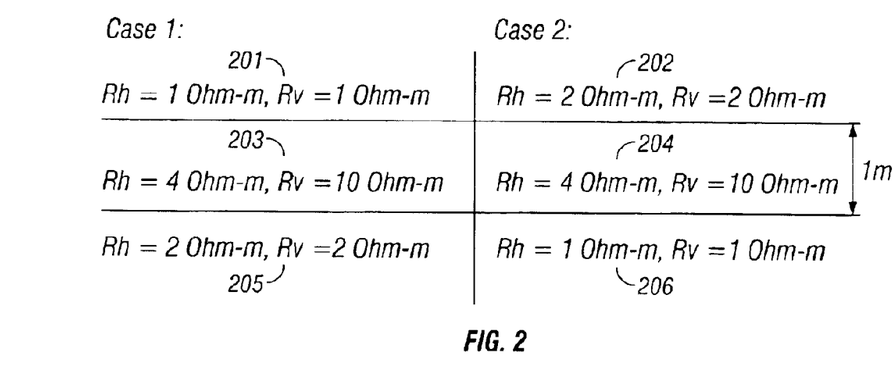
FIG. 2 shows an example of two simulated cases of horizontal formations.

In FIG. 2, two cases of layer structure, labeled Case 1 and Case 2, exemplify how the 3DEX™ tool is sensitive to directionality. Case 1 and Case 2 are inverted versions of each other. In both cases, the middle layers 203 and 204 are 1 m thick and have a horizontal resistivity ($R_h$) of 4 Ω-m and a vertical resistivity ($R_v$) of 10 Ω-m. In Case 1, the resistivities are 1 Ω-m in both horizontal and vertical directions in the top layer 201 and 2 Ω-m in both horizontal and vertical directions for the bottom layer 205. In Case 2, the resistivities are interchanged from Case 1, with a horizontal and vertical resistivity 2 Ω-m in the top layer 202 and a horizontal and vertical resistivity of 1 Ω-m in the bottom layer 206. In both cases, the relative dip of the borehole is 90 degrees (horizontal borehole) and the azimuthal angle of rotation of $T_x$ is 30 degrees from vertical. The table below shows an example of magnetic field responses for the 3DEX™ instrument taken while positioned horizontally in the middle of the center layer.

TABLE I

Example of Multi-component response

| Magnetic field response (A/m) | Case1 | Case2 |
|---|---|---|
| Hxx | 8.86777008E-04 | 8.86777008E-04 |
| Hxy | −1.99889226E-04 | −1.99889226E-04 |
| Hxz | 2.45139177E-04 | −2.45139207E-04 |
| Hyy | 1.11758942E-03 | 1.11758942E-03 |
| Hyx | 1.99889240E-04 | 1.99889240E-04 |
| Hyz | −1.41531185E-04 | 1.41531200E-04 |
| Hzz | 1.16889027E-03 | 1.16889027E-03 |

Responses are normalized to a unit transmitter-receiver moment and are in units of A/m. The operating condition typically uses an excitation frequency of 20 kHz but not limited to this frequency. These simple results demonstrate that although $H_{xx}$, $H_{xy}$, $H_{yy}$, $H_{yz}$, and $H_{zz}$, are insensitive to directionality, the $H_{xz}$ and $H_{yz}$ components (shown in bold in the table) are sensitive to directionality in a horizontal wellbore. This also holds for the reciprocal relations on $H_{zx}$ and $H_{zy}$ components. With this knowledge, a practitioner of the art can discriminate whether a layer is above or below the borehole trajectory and thus can use said knowledge for geo-steering purposes.

Figure 3A:
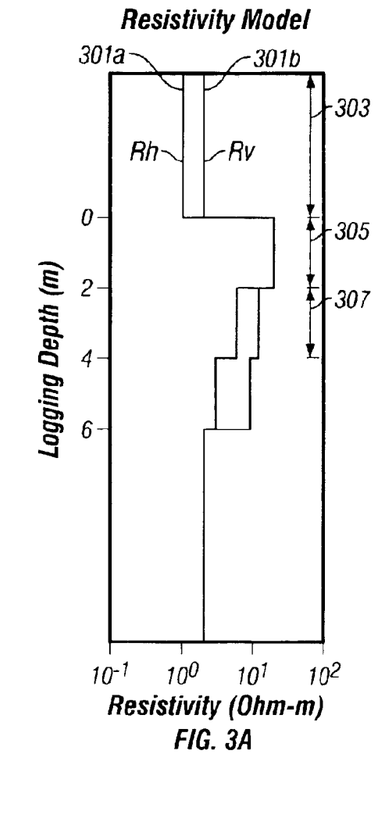
FIG. 3a shows a plot of a model of formation resistivity against logging depth, with three anisotropic intervals.
Figure 3B:
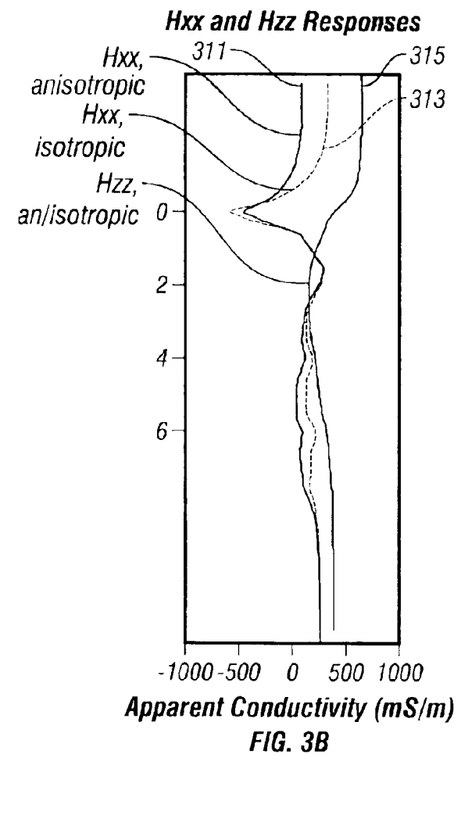

Shown in FIG. 3a is a resistivity model of a medium with horizontal and vertical resistivities denoted by 301a and 301b. The model has three anisotropic intervals indicated as 303, 305, and 307 in which the vertical resistivity $R_v$ is greater than the horizontal resistivity $R_h$. FIG. 3b shows the apparent conductivity responses for the $H_{xx}$ (311) component in the anisotropic model of FIG. 3a. Also shown is the $H_{xx}$ component (313) for the case of a resistivity model that is isotropic at all depths. The $H_{zz}$ (315) component of the response for an isotropic model is the same as for the anisotropic model. From FIG. 3b, the following observations may be made about the resistivity responses for a vertical well in an anisotropic formation: The $H_{zz}$ curve is not responsive to anisotropy in the formation, while the $H_{xx}$ curve is responsive. The $H_{xx}$ response is suppressed by anisotropy. The $H_{xx}$ curve is quite complicated and can even reverse sign close to significant layer resistivity contrasts. The $H_{xx}$ curve also may display spikes at bed boundaries.

The High Definition Induction Logging (HDIL$^{SM}$) device of Baker Hughes comprises a number of receiver coils spaced at various axial distances from a transmitter coil. Operationally, HDIL$^{SM}$ and 3DEX™ can preferably be logged simultaneously but this is not a limitation to the method of the present invention. The method involves using the HDIL$^{SM}$ data to obtain the dip angle to enable calculations made in 3DEX™. HDIL$^{SM}$ processing yields $R_t$ of the formation, invasion profiles and proximity, as well as changes in proximity, to shoulder beds. A single sub-array curve (i.e. sub-array 5) of the HDIL$^{SM}$ apparent resistivity curves can be used as a quality check of the 3DEX™ $H_{zz}$ data. HDIL$^{SM}$ data can give an estimate of relative dip angle, and this estimate can be used in a joint inversion of HDIL$^{SM}$ and 3DEX™ data for $R_h$, $R_v$, $R_t$ and θ, using the Moran-Gianzero equation to be described later.

The method of this invention can be described in three steps: filtering, calculation of correlation coefficients, and determining a dip angle. A processor for performing filtering and the calculations of said correlation coefficients and dip angle can be conveyed on the instrument assembly in the downhole environment or situated at the surface. It is understood that the location of said processor is a matter of convenience and is not to be construed as a limitation on the present invention.

Figure 4:
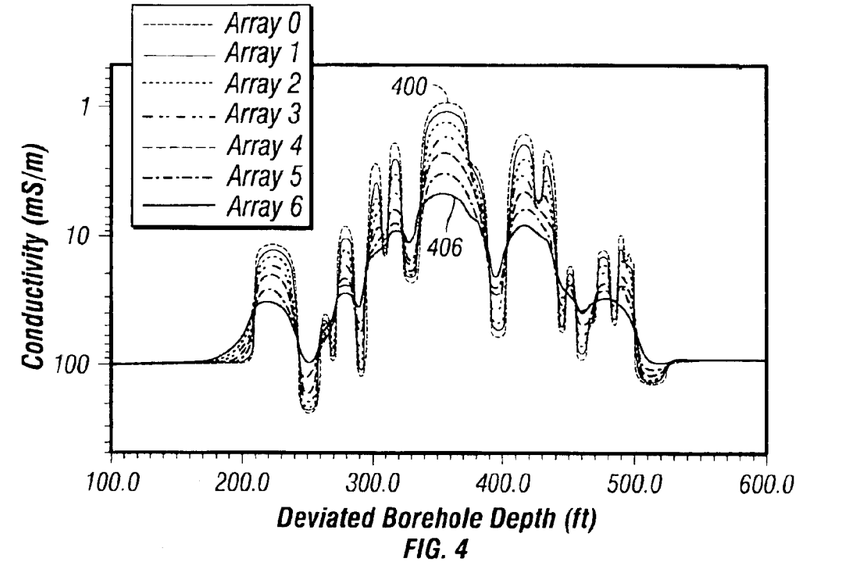
FIG. 4 shows the numerically simulated HDIL skin-effect corrected curves.

FIG. 4 shows a collection of curves representing conductivity measurements at several depths in a numerically-simulated HDIL$^{SM}$ skin-effect-corrected log where the relative dip angle is set at 60 degrees. The term "relative dip angle" as used in the application refers to a relative angle of inclination between the z-axis of the instrument (and the axis of the borehole) and the normal to the bedding plane. The seven curves correspond to seven subarrays having differing separation distances between transmitter and receiver coils. The most curved array (400) is the curve resulting from the array having the smallest separation distance between transmitter and receiver, and the least curved array (406) is the curve resulting from the array having the largest separation distance. The variation in the shoulder steepness is inversely related to this separation distance. Typical dipping effects are observed as the charge horns occur near bed boundaries.

Figure 5:
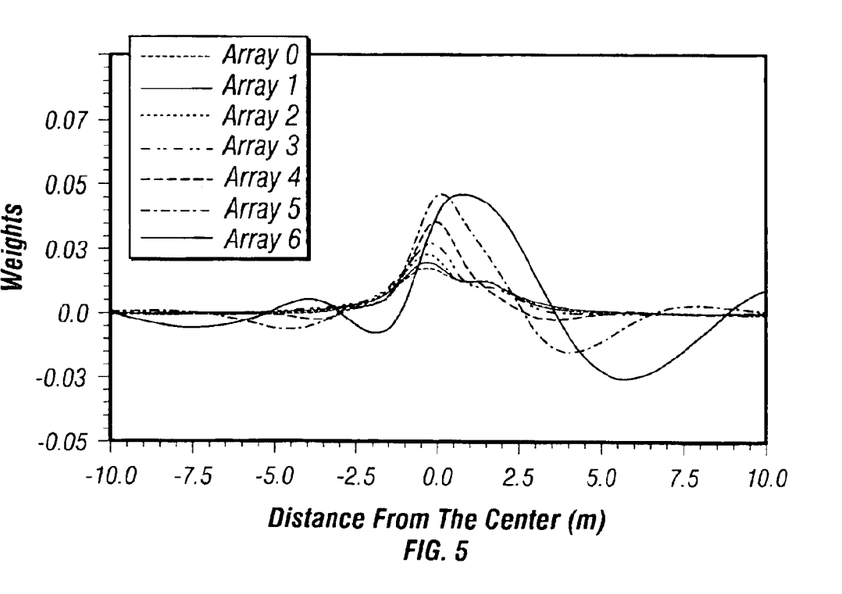
FIG. 5 shows one of the filter sets designed to smooth the seven curves of FIG. 4.

FIG. 5 shows one of several filter sets that operate on the seven response curves of FIG. 4. Pre-designed filters corresponding to every discrete dip angle reside in a database. The filter set shown in FIG. 5 is for relative dip angle of 60°.

In order to estimate the dip angle, every set of the filters is applied to a section of the HDIL$^{SM}$ curves. The correlation coefficient is calculated for every set of the filtered curves. The end result of these calculations is a computed correlation coefficient at each angle. The process is described in detail below. Corrections such as borehole effects removal, skin effect correction are applied when necessary. Once the dip estimate is computed and used as initial model guess, the 3DEX multicomponent dataset can be inverted by itself or both multicomponent and multi array datasets can be inverted simultaneously.

Correlation coefficients are calculated using the obtained target curves (FIG. 4) and corresponding filtered curves (FIG. 5). The shape of a response curve of an array at a step boundary depends on the length of the array (the distance between the transmitter and the receiver) and the angle of intercept. These dependencies can be seen in FIG. 6. Curve 603 represents the response of an array that is 30" long incident at a relative dip angle of 30° to the step function 600. Similarly, curve 606 represents the response of an array that is 60" long incident to the step function 600 at the same relative dip angle. Curve 606 experience a more pronounced effect than curve 603 due to the increased length of the array. Also, curve 603 can be seen to differ from curve 613, which is the response of the 30" array incident at a dip angle of 45° to the same step function. Curve 616 differs similarly from 606. It is possible to compute a filter to transform the curve representing the 30" array at 30° 603 to the curve representing the 60" array at 30° 606. These filters can be computed prior to application and stored in a database. Likewise, it is possible to transform the response of the 20" array at 30° 613 to the response of the 30" array 616, and so forth. Each transform is unique with each angle, such that a mathematical transformation that transforms curve 603 to curve 606 (30° angle) does not equivalently transform curve 603 to curve 606 (45° angle). The transformations are also unique among array lengths. In a preferred method of the invention, each filter is designed to transform the response curve of an array to that of the next longer array. (i.e. 10" to 20", 20" to 30", etc.). This transformation process can be repeated at a variety of angles to create filter sets.

Figure 6:
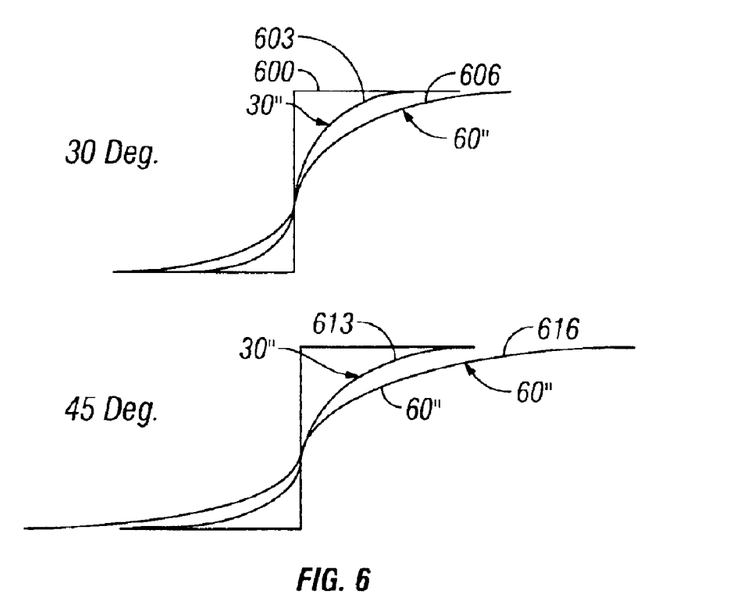
FIG. 6 shows an example of how the response curves of arrays differ due to length and due to dip angle.

Filters are preferably grouped and labeled according to angle and array length using a letter and a number. The letter corresponds to the length of the array being transformed. Hence a filter whose label is A transforms the response curve of a 10" array to the response curve of a 20" array. A filter labeled B transforms the response curve of a 20" array to the response curve of a 30" array, etc. The number indicates the dip angle. Hence, in the preferred method of the invention, B10 transforms a 20" array response curve at a dip angle of 10° to the response curve of a 30" array at 10°. A typical set of angular position values are spaced from 0° to 75° at every 5°. Therefore, at every angle, it is possible to transform array values to obtain a theoretical curve of the array having the next higher spacing.

Figure 7:
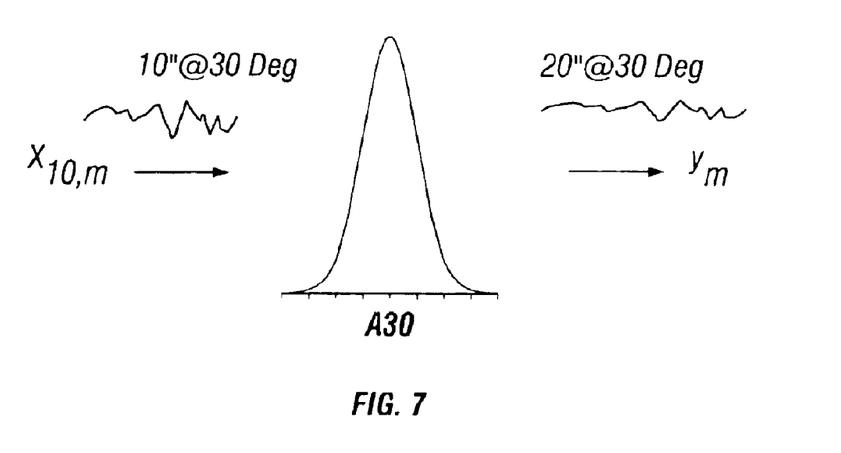
FIG. 7 shows a transformation process of a response curve of the invention.

A correlation coefficient can be computed by comparing, at a given angle, the transformed response curve to the actual response curve of the array. A typical example is shown in FIG. 7. The response curve (labeled $x_{10,m}$) of the 10" array at 30° is transformed by filter A30 to obtain a mathematically-derived response curve (labeled $y_m$) representing the 20" array at 30°. The correlation of the derived curve $y_m$ with the actual response curve $x_{20,m}$ (not shown) is obtained using the equation:

$$corr.coeff. = \frac{\sum x_{20,m} y_m}{\sqrt{\sum x_{20,m}^2 \sum y_m^2}} \quad (1)$$

Figure 8:
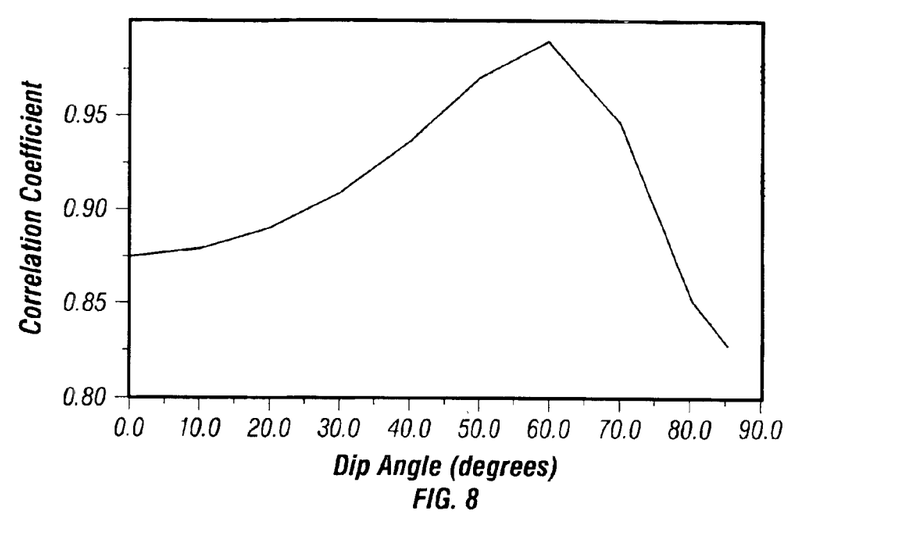
FIG. 8 shows the result of calculations of the correlation coefficient at several angles.

Continuing this process over all angles, a correlation coefficient can be calculated at all possible angles of orientation of a single array. Once a correlation coefficient is calculated at all considered angles, it is possible to create a plot of correlation coefficient vs. dip angle, as shown in FIG. 8. By the method described herein, the correlation coefficient should be a maximum when the angle at which the correlation coefficient is computed most matches the dip angle of the drilling tool. Thus, the peak of the correlation coefficient plot corresponds to the dip angle of the underlying formation structure. In the example of FIG. 8, the curve of the correlation coefficient peaks at 60 degrees, which matches the true dip angle used to simulate the HDIL$^{SM}$ data in FIG. 4.

This process of finding correlation coefficients can be repeated for all arrays, obtaining an angle for each array at which the correlation coefficient is a maximum. Averaging these values leads to a consensus angle. In a preferred embodiment of the invention, a preliminary dip angle estimate is made. A reasonable first estimate can be achieved using the following equation from *Moran and Gianzero, Geophysics*, July 1979, Vol. 44, No. 7 (eq. 44, p. 1278):

$$R_a = \frac{\lambda R_h}{\sqrt{\sin^2\theta + \lambda^2\cos^2\theta}} \quad (2)$$

where $\theta$ is the angle of relative dip between the tool axis and the normal to the plane of the formation, $R_a$ is the apparent resistivity measured by the multi-array induction tool, $R_h$ is the horizontal resistivity (parallel to bedding), and $\lambda$ is the resistivity anisotropy coefficient and is equal to $\lambda=\text{sqrt}(R_v/R_h)$. $R_h$ is the horizontal resistivity, and $R_v$ is the vertical resistivity (perpendicular to bedding). Equation (2) can be used for deriving an initial estimate for the dip angle $\theta$ by from measured resistivity values. In a horizontal well, equation 2 also provides constraint of 3DEX™ resistivities used in a conditional step within the resistivity processing or inversion processing of data, this data being from either one or the other or both induction tools.

Figure 9:
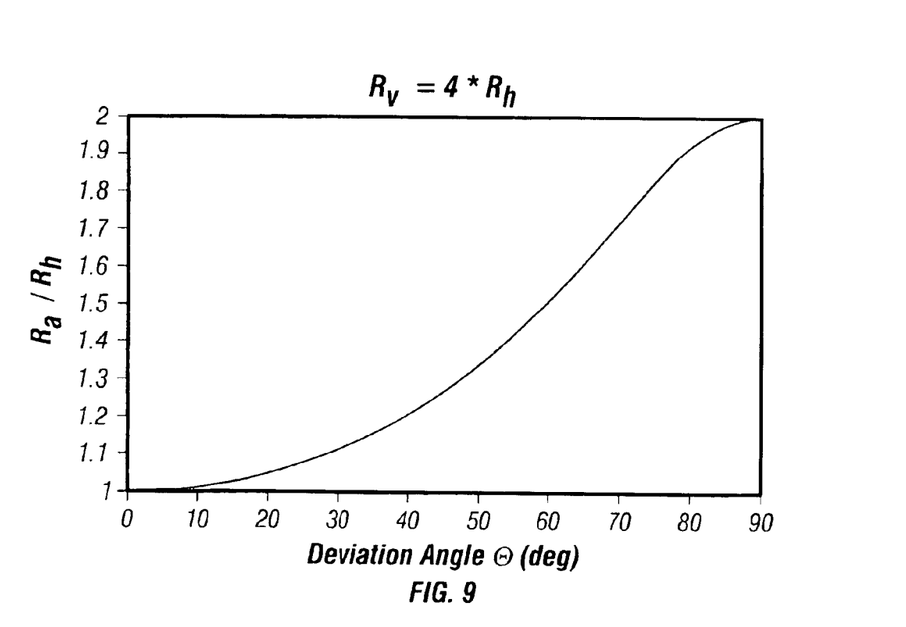
FIG. 9 shows a graph of a ratio of apparent and to horizontal resistivities vs. the deviation angle of the drill tool.

FIG. 9 shows an example of how the functional relationship between $R_a$, $R_h$, $R_v$ and $\theta$ changes with dip angle of deviated wells. From eq. 2, since $\lambda=\text{sqrt}(R_v/R_h)$, at a relative dip angle of $\theta=0°$, the apparent resistivity is equal to the horizontal resistivity, and at an angle of $\theta=90°$, the apparent resistivity is equal to $\text{sqrt}(R_h R_v)$. Thus, in a horizontal well, HDIL provides a geometric mean of horizontal and vertical resistivities. In the specific example of FIG. 9, the vertical resistivity is chosen to be four times that of the horizontal resistivity ($R_v=4R_h$). Thus, at a dip angle of 90 degrees, the apparent resistivity measures twice that of the horizontal resistivity. A practitioner of the art will be able to use the graph of FIG. 10 along with measured resistivity values to determine an initial guess of the deviation angle of the tool.

Figure 10:
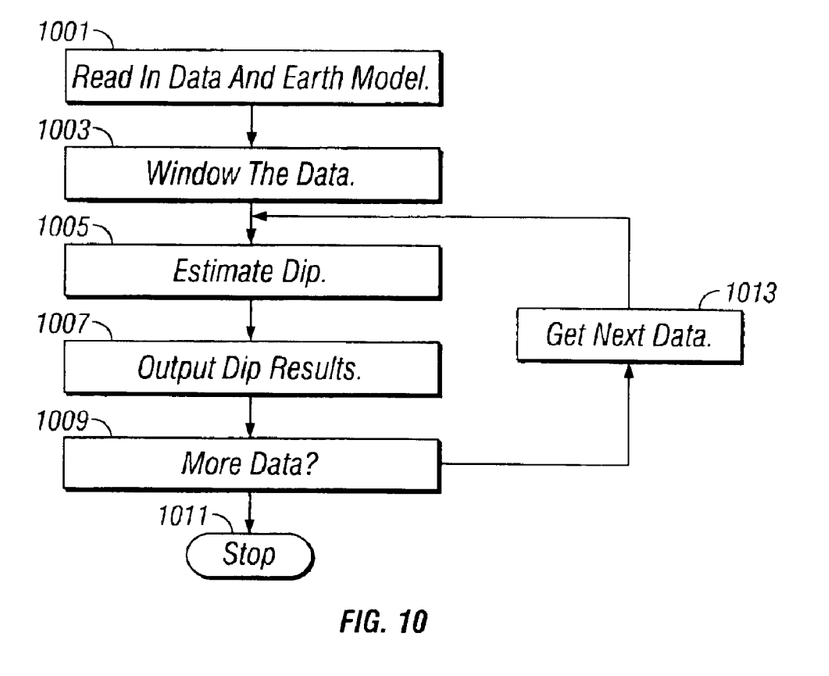
FIG. 10 shows a flowchart of the process for determining the dip angle.

FIG. 10 is a flow chart of the process for HDIL$^{SM}$ dip estimation. The process begins in block 1001 as HDIL$^{SM}$ data as well as an earth model is entered into a computer. In the step of Block 1003, a window is set around the HDIL$^{SM}$ data. In Block 1005, a value of the dip angle is obtained using the filtering method discussed above. The results are output in Block 1007. In Block 1009, the computer checks whether there is more data that needs to be processed. In the event that there is more data, the process flows to Block 1013, where the computer obtains the next data and return to the process at Block 805. Otherwise, if there is no next data, the computer will stop (Block 1011).

Figure 11:
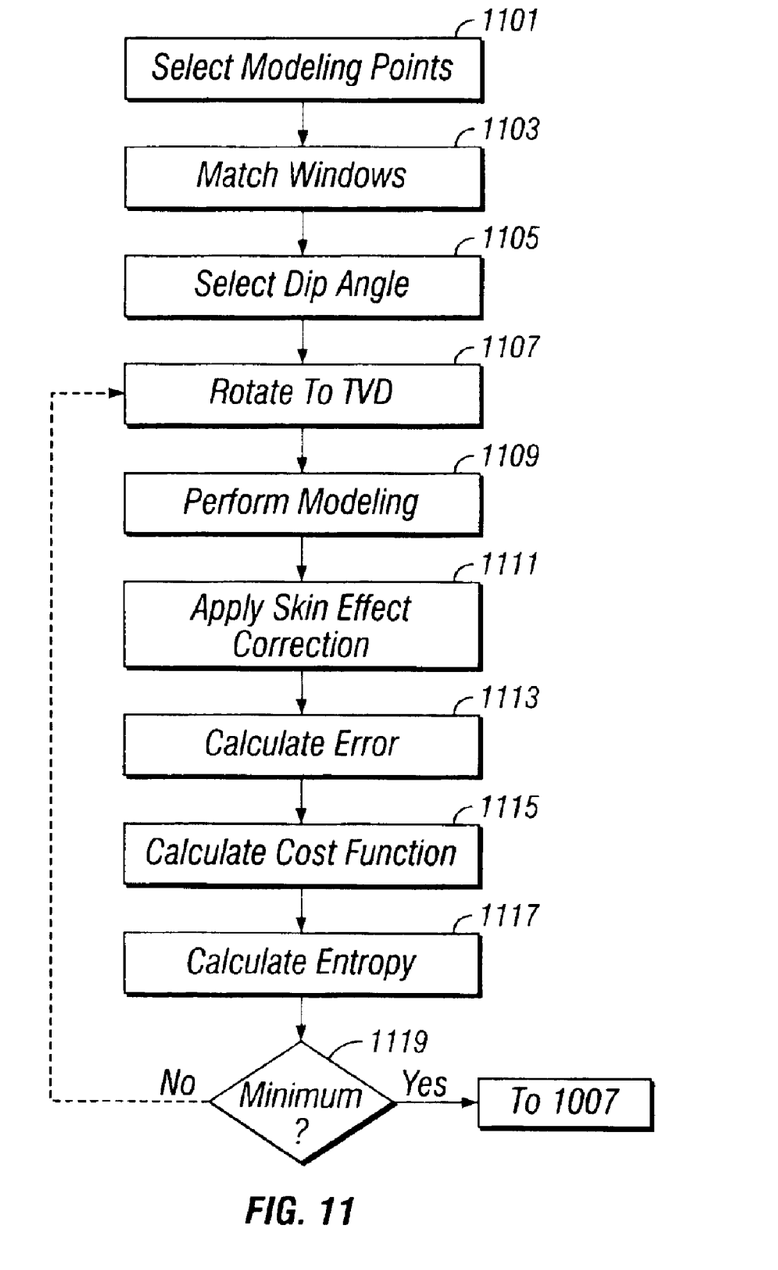
FIG. 11 shows a flowchart detailing the iterative process used in determining the dip angle.

FIG. 11 represents an alternate method of determining the relative dip angle. Block 1101 in FIG. 12 requires a selection of modeling points. These points are selected for the entire log, usually in the middle of the bed boundaries of the earth model. The selection made in Block 1101 is performed only once in the entire run, although there may be many possible iterations of the rest of the flowchart. In Block 1103, the earth-model data is windowed to match the windowed HDIL$^{SM}$ data. The loop in the flowchart that follows enables determining an estimate of the dip angle. In Block 1105, the method selects a preliminary estimate of dip value to start the process. Blocks 1107 and 1109 apply the assumed value of the dip angle from Block 1105 to the windowed earth model to forward model. In Block 1107, the formation is rotated to true vertical depth (TVD). It is preferably assumed that the earth model bed boundaries are measured and identified along the borehole axis. Thus, rotation to TVD enables further processing, as is performed in Block 1109. In a preferred embodiment of the invention, the possible dip angles are defined based on eq. (2) above. Alternatively, the possible dip angles may be defined in steps over a range of values based on a priori information.

Following the forward modeling, in Block 1111, the modeled results are corrected for skin effects. In the next step, Block 1113, for each modeling point i and each associated array j of the HDIL$^{SM}$ and earth-model (synthetic) data, the method performs an error calculation for $\Delta_{ij}$, which is given by the following equation:

$$\Delta_{ij} = \frac{HDIL_{ij} - Synthetic_{ij}}{Synthetic_{ij}} \quad (3)$$

Having determined values for $\Delta_{ij}$, a cost function value $\delta_i$ is calculated in the method of Block 1115 using the following formula:

$$\delta_i = \sum_{j>i} (\Delta_{ij} - \Delta_{i(j-1)})^2 \quad (4)$$

With $\delta_i$ calculated at each point i, it is now possible to compute an entropy for the system. In Block 1117, an entropy is calculated using the following equation:

$$\text{Entropy} = \Sigma_i \delta_i \times \text{bedthk}_i \quad \text{eq. (5)}$$

where bedthk is the thickness of the bed layer.

The next step, Block 1119, checks if entropy is a minimum value. It is the intent of the invention that the value with the lowest entropy determines the best fit to data. If a minimum has not yet been achieved, the method enables selecting another dip value using a search method and repeat the process beginning at Block 1105. One such possible search method would be the golden search. If a minimum is achieved, it is now possible to continue on to Block 1007 in the flowchart of FIG. 10.

The invention provides a method for determining a first estimate of dip angle of a borehole. This first estimate can preferably be used as a first estimate of relative dip in inversion of multi-component data described in application Ser. No. 10/091,310 to Zhang et al, now U.S. Pat. No.

6,643,589, the contents of which are fully incorporated herein by referenre. Using the derived dip angle reduces the number of parameters in the inversion method of Zhang at at, thereby improving its efficiency and reducing the possibility of getting stuck in a local minimum during the iterative inversion process.

As described in the Zhang application, the inversion is performed using a generalized Marquardt-Levenberg method. The use of the method disclosed in the Zhang application is for exemplary purposes only and any other global optimization method may be used. In this generalized Marquardt-Levenberg method, a data objective function is defined that is related to a difference between the model output and the measured data. The iterative procedure involves reducing a global objective function that is the sum of the data objective function and a model objective function related to changes in the model in successive iterations. The inclusion of the data objective function in the iterative procedure stabilizes the inversion process. In an alternate embodiment of the invention, the formation azimuth angle is excluded from the iterative process by using derived relations between the multicomponent measurements. In another embodiment of the invention, the mismatch between the expected and measured values is minimized for discrete values of the formation azimuth angle with an iterative procedure being used for determining the formation dip and resistivities (both horizontal and vertical). Any of the various embodiments described by Zhang may be used in the present invention.

In an optional embodiment of the invention, once an initial estimate of the relative dip angle has been obtained, a joint inversion is carried out of the multi-component and multi-array data. This is, of course, more time consuming than just inverting the multi-component data only using the angle estimate from the multi-array data. However, it is a more robust method than that disclosed in Zhang wherein the possibility exists that due to a poor initial choice of the relative dip angle, a global solution may not be reached.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of processing of resistivity measurements made of an earth formation using an instrument conveyed in a wellbore therein, said wellbore having a relative dip angle to a normal to a bedding of said earth formation, the method comprising:
    (a) obtaining a plurality of multi-array measurements over a logging interval;
    (b) defining a plurality of possible dip angles;
    (c) transforming said plurality of multi-array measurements using functions corresponding to each of said plurality of possible dip angles and providing transformed data corresponding thereto; and
    (d) determining from said transformed data an estimate of said relative dip angle.

2. The method of claim 1 wherein determining said estimate of the relative dip angle further comprises:
    (i) calculating for said logging interval and for each of said plurality of possible dip angles, a correlation coefficient of at least one of said plurality of multi-array measurements with transformed multi-array data corresponding to others of said plurality of multi-array measurements; and
    (ii) finding a maximum correlation coefficient from the plurality of correlation coefficients.

3. The method of claim 1, further comprising obtaining multi-component data and determining therefrom and from said determined dip angle a parameter of interest of the earth formation.

4. The method of claim 3 wherein the parameter of interest comprises a horizontal resistivity of the earth formation.

5. The method of claim 4, determining said horizontal resistivity further comprises inverting said multi-component data.

6. The method of claim 5 wherein inverting said multi-component data further comprises using an initial estimate of layer boundaries derived from said multi-array data.

7. The method of claim 5 wherein inverting said multi-component data further comprises minimizing a global objective function that is the sum of a data objective function and a model objective function.

8. The method of claim 5 wherein said inversion further comprises a joint inversion of multi-component and multi-array data.

9. The method of claim 5 wherein the parameter of interest further comprises an azimuth of the formation relative to the borehole.

10. The method of claim 5 wherein said inversion further comprises a joint inversion of multi-component and multi-array data.

11. The method of claim 3 wherein said parameter of interest comprises a vertical resistivity of the formation.

12. The method of claim 1, wherein defining a plurality of possible dip angles further comprises obtaining a preliminary estimate of said dip angle using the relation $$R_\beta = \frac{\lambda R_h}{\sqrt{\sin^2\theta + \lambda^2\cos^2\theta}}$$

where θ is the angle of relative dip between the tool axis and the normal to the plane of the formation, $R_h$ is the apparent conductivity measured by the multi-array induction tool, and λ is the resistivity anisotropy coefficient and is given by λ=sqrt($R_v/R_h$), where $R_h$ is the horizontal resistivity, and $R_v$ is the vertical resistivity.

13. The method of claim 1 wherein sad transforming comprises a filtering.

14. A method of processing of electrical resistivity measurements made of an earth formation using an instrument conveyed in a wellbore therein, said wellbore having a relative dip angle to a normal to bedding of said earth formation, the method comprising:
    (a) obtaining a plurality of multi-array induction measurements over a depth interval;
    (b) selecting a plurality of modeling points;
    (c) defining a plurality of possible dip angles;
    (d) for each of the plurality of possible dip angles,
        (i) determining a model output in true vertical depths
        (ii) applying a skin correction to said model output, and
        (iii) determining an entropy function related to a difference between the skin-corrected model output and each of the plurality of multi-array induction measurements; and
    (e) obtaining an estimated dip angle from said entropy function at the plurality of possible dip angles.

15. The method of claim 14, further comprising obtaining multi-component data and determining therefrom and from said determined dip angle a parameter of interest of the earth formation.

16. The method of claim 15 wherein the parameter of interest comprises a horizontal resistivity of the earth formation.

17. The method of claim 16, determining said horizontal resistivity further comprises inverting said multi component data.

18. The method of claim 15 wherein said parameter of interest comprises a vertical resistivity of the formation.

19. A method of processing of resistivity measurements made of an earth formation using an instrument conveyed in a wellbore therein, said wellbore having a relative dip angle to a normal to a bedding of said earth formation, the method comprising:
   (a) obtaining a plurality of multi-array measurements over a logging interval;
   (b) defining a plurality of possible dip angles; and
   (c) determining from said plurality of multi-array measurements and said plurality of possible dip angles an estimate of said relative dip angle.

20. A system for determining a parameter of interest of an earth formation comprising:
   (a) a logging instrument conveyed into a borehole in said earth formation, said borehole having a relative dip angle to a normal to a bedding of said earth formation, the logging instrument comprising at least one transmitters and at least one receiver for obtaining a plurality of multi-array measurements over a logging interval; and
   (b) a processor for transforming said plurality of multi-array measurements using a plurality of functions, each of said plurality of functions corresponding to a possible dip angle, said processor further determining from said transformed data an estimate of said relative dip angle.

21. The system of claim 20 wherein said processor peforms said transformation by a filtering operation.

22. The system of claim 20 wherein said logging instrument further comprises a plurality of transmitters and a plurality of receivers for obtaining multicomponent measurements and wherein said processor further determines a horizontal and a vertical resistivity of said formation.

23. A system for determination of a parameter of interest of an earth formation, said system comprising:
   (a) a logging instrument conveyed into a borehole in said earth formnation, said borehole having a relative dip angle to a normal to a bedding of said earth formation, said logging instrument comprising at least one transmitter and at least one receiver obtaining a plurality of multi-array induction measurements over a logging interval;
   (b) a processor for:
      (i) selecting a plurality of modeling point;
      (ii) defining a plurality of possible dip angles;
      (iii) for each of the plurality of possible dip angles,
         (A) determining a model output in true vertical depth,
         (B) applying a skin correction to said model output, and
         (C) determining an entropy function related to a difference between the skin-corrected model output and each of the plurality of multi-array induction measurements; and
      (iv) obtaining an estimated dip angle from said entropy function at the plurality of possible dip angles.

24. The system of claim 23 wherein said logging instrument further comprises a plurality of transmitters and a plurality of receivers for obtaining multicomponent measurements and wherein said processor further determines a horizontal resistivity and a vertical resistivity of said earth formation.

* * * * *